May 14, 1940.   H. G. DAVIS   2,200,574
REVERSIBLE POWER TRANSMISSION MECHANISM
Filed Oct. 14, 1939    2 Sheets-Sheet 1

INVENTOR
HAROLD G. DAVIS
BY
ATTORNEY

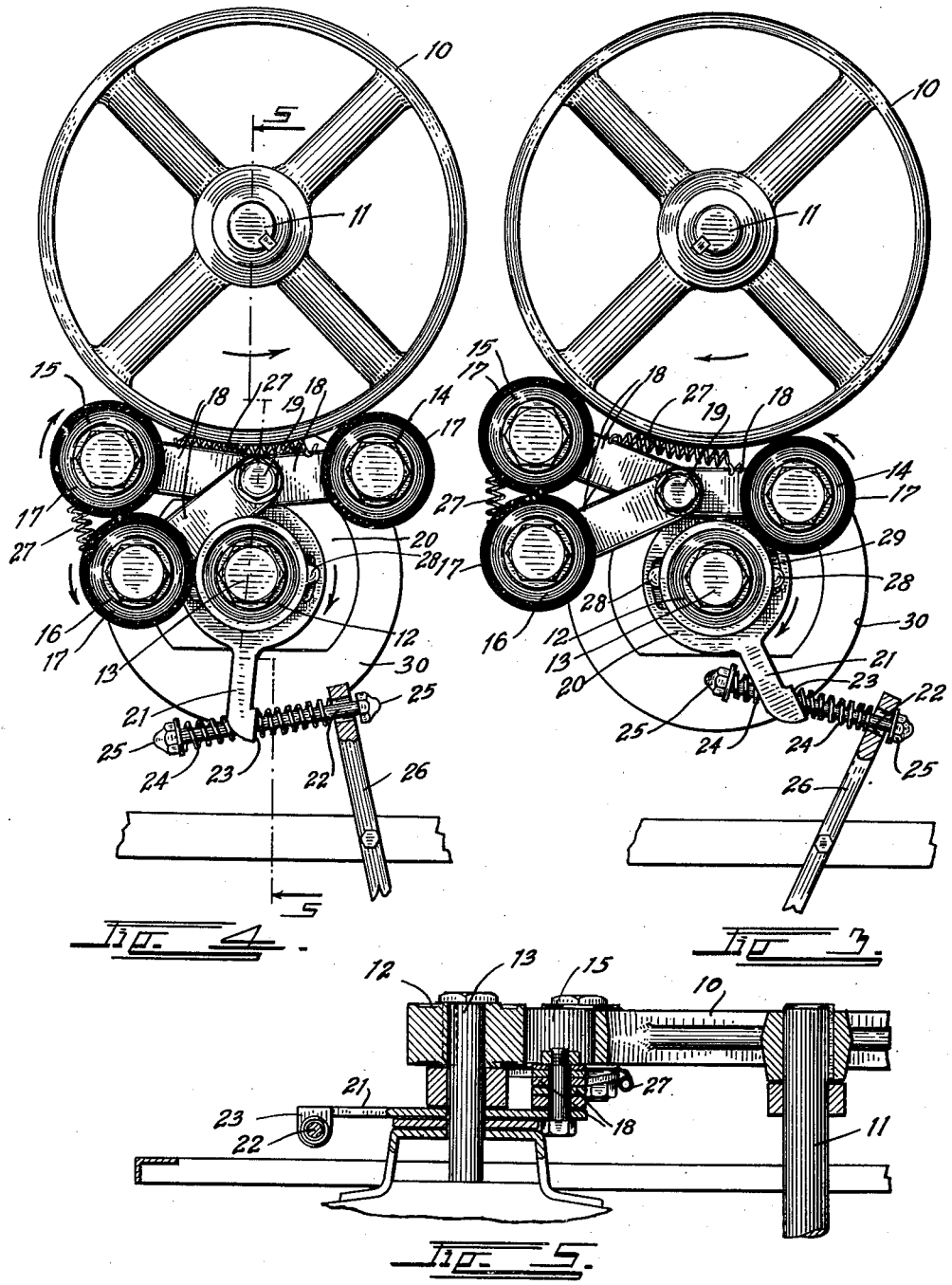

Patented May 14, 1940

2,200,574

UNITED STATES PATENT OFFICE 2,200,574

REVERSIBLE POWER TRANSMISSION MECHANISM

Harold G. Davis, Denver, Colo.

Application October 14, 1939, Serial No. 299,502

6 Claims. (Cl. 74—202)

This invention relates to a power transmission mechanism and has for its principal object the provision of a simple, and efficient device by means of which any desired device may be driven alternately in opposite directions.

It is more particularly intended for driving dishwashing and clothes washing machines having a washing member which is alternately oscillated, first in one direction, and then in the other. It is however, not limited to these particular uses, but will be found valuable in any installation where it is desired to selectively transmit power in either direction, such as in hoisting or elevating devices, machine tools, etc.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 3 is a similar view illustrating the mechanism in the "forward" driving position.

Fig. 4 is a similar view illustrating the mechanism in the "reverse" driving position.

Fig. 5 is a detail sectional view, taken on the line 5—5, Fig. 4.

Figure 1:
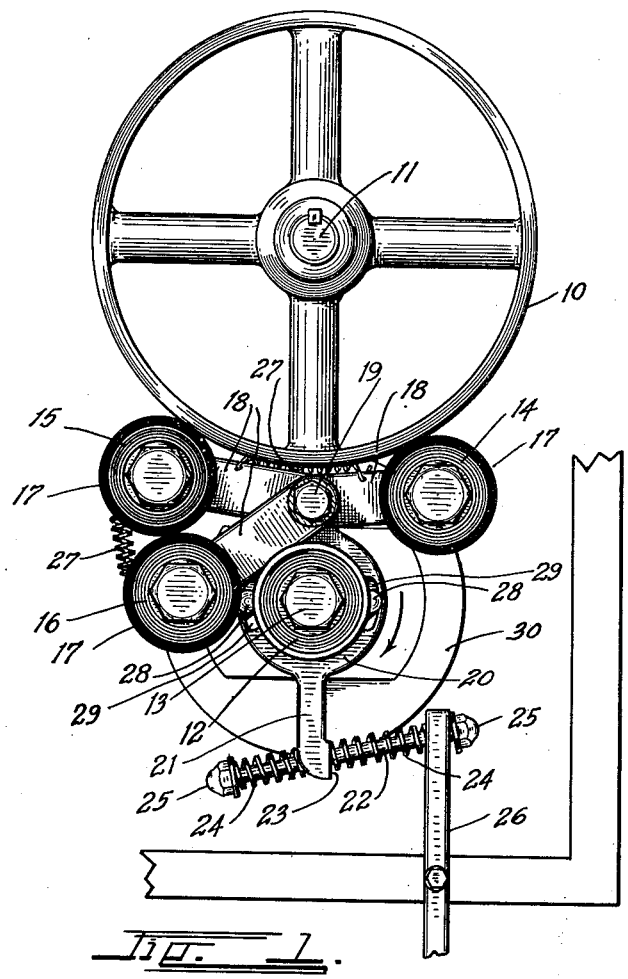
Fig. 1 is a fragmentary diagrammatic view illustrating the improved transmission mechanism in the "off" or "neutral" position.

The device being driven by the improved transmission is indicated by a driven wheel 10 mounted on a driven shaft 11. The prime mover or motive power is indicated by a drive pulley 12 mounted on a drive shaft 13. The power is transmitted from the drive pulley 12 to the wheel 10 through a series of friction rollers designated by numeral as follows: forward roller 14, reverse roller 15, intermediate roller 16. The friction rollers are preferably covered with some suitable friction surface such as rubber rims 17.

Each of the rollers is supported on an independent hinged arm 18. All of the arms extend from a common pivot member 19. The pivot member 19 is mounted on rotatable plate 20 which is axially mounted on the drive shaft 13 so that it may be rotated about the latter. A lever 21 projects from the plate 20 for changing its circumferential position about the shaft 13 as a pivot.

The lever 21 may be operated from any suitable operating device, depending upon the type of machine in which the transmission is installed. As illustrated, a spring rod 22 is passed through an ear 23 on the lever. The ear is compressed between two oppositely acting compression springs 24 which are held on the rod by means of terminal nuts 25. The rod also passes through an operating lever 26.

Figure 2:
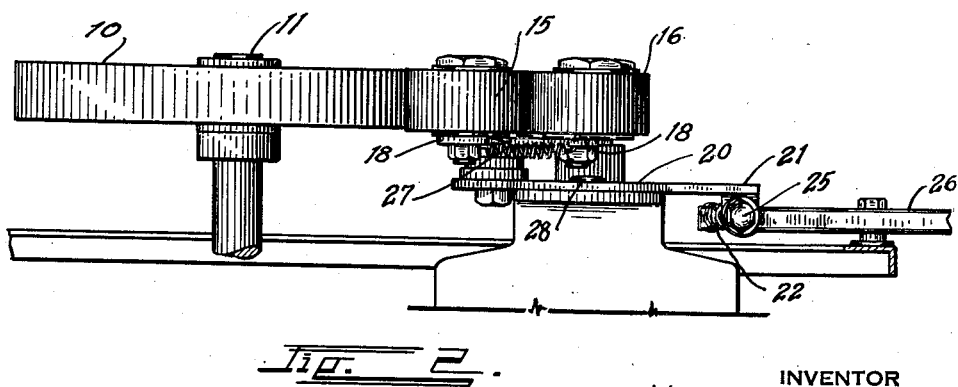
Fig. 2 is an edge view thereof looking in the direction of the arrow 2, Fig. 1.

It can be readily seen that if the lever 26 is moved in one direction, it will compress one of the springs 24 against the ear of the lever 21, giving a resilient pressure action thereto, as shown in Fig. 2. When moved in the other direction, the opposite action takes place, as shown in Fig. 3. It is preferred, although it is not absolutely necessary, to place tension springs 27 between the various arms to hold the rollers together, and prevent the arms from swinging freely about.

Let us assume that the drive pulley 12 is being continuously rotated to the right or in a clockwise direction. When the control lever is in the position of Fig. 1, the rollers 14 and 16 do not contact the drive pulley 12. Therefore all parts of the device are at rest except the pulley 12. If the lever 21 is swung to the right, as shown in Fig. 3, it will act to pull the forward roller 14 between the drive pulley 12 and the driven wheel 10 with a wedging action causing the power to be transmitted to the wheel 10 in the same direction from the pulley 12.

If the lever 21 is swung to the left, as shown in Fig. 4, it will bring the reverse roller 15 against the driven wheel 10, and will pull the intermediate roller 16 between the drive pulley 12 and the reverse roller 15. This causes the power from the drive pulley to be transmitted to the intermediate roller in reverse direction; thence to the reverse roller 15 in forward direction; and thence to the driven wheel 10 in reverse direction. Thus it can be readily seen that by simply swinging the lever 21 backward and forward, the driven wheel 10 will be caused to rotate backward and forward.

In the installation illustrated the plate 20 is held in place by means of headed members 28 riding in arcuate slots 29 in the plate 20. Any means for rotatably mounting the plate may be employed, however. The motive power illustrated is an electric motor 30. The springs 24 can be selected to place just the necessary pressure on the frictional contact to transmit the power required.

In the drawings the three rollers have all been illustrated as of uniform diameter. They could, however, be of differing diameter. For instance, the forward roller 14 could be considerably larger than the rollers 15 and 16. This would be particularly valuable in installations where the forward roller was used more than the others as it would provide a greater wearing surface thereon. The differing diameters would not effect the speed ratio between the driving and driven members.

It is desired to call attention to the fact that should any rollers wear down to a smaller diameter, it will not affect the efficiency of the transmission in any way, since all of the rollers are independently mounted to accommodate to each other. The only result would be that the shifting member will move through a greater arc to contact the rollers and this greater movement would be automatically accommodated by the springs 24. The lever 26 always moves through a greater arc than necessary for the actual shifting and the springs, therefor, are always placed under sufficient compression to accommodate for wear.

The cushioning action of the springs 24 also serves to bring the driven wheel to a smooth stop or start without strain or stress on the transmission mechanism thus preventing uneven wearing on the roller peripheries.

While the shifting member 20 has been illustrated and described as rotatable about the drive shaft 13, it is conceivable that it could, if preferred for any reason, be mounted to rotate about the driven shaft 11. Either position would place the pivot point 19 intermediate the drive and driven members in the position illustrated.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A reversible power transmission device comprising: a drive pulley; a driven wheel spaced from said drive pulley; a shifting member rotatable about the axis of said drive pulley; a pivot member on said shifting member intermediate of and in alignment with the axis of said wheel and the axis of said pulley; a hinged arm pivoted on and extending to one side of said pivot member; a roller mounted on the extremity of said arm; and means for rotating said shifting member about the axis of said drive pulley to pull said roller into contact with both said pulley and said wheel.

2. A reversible power transmission device comprising: a drive pulley; a driven wheel spaced from said drive pulley; a shifting member rotatable about the axis of said drive pulley; a pivot member on said shifting member intermediate the axis of said wheel and the axis of said pulley; a first hinged arm pivoted on and extending to one side of said pivot member; a forward roller mounted on the extremity of said first arm; a pair of arms pivoted on and extending from the opposite side of said pivot member; a reverse roller mounted on one arm of said pair; an intermediate roller mounted on the other arm of said pair, said latter two rollers contacting each other; and means for rotating said shifting member about the axis of said drive pulley to selectively pull either said forward roller first into contact with said pulley and wheel or said reverse and intermediate rollers into contact respectively with said wheel and said pulley.

3. A reversible power transmission device comprising: a drive pulley; a driven wheel spaced from said drive pulley; a shifting member rotatable about the axis of said drive pulley; a pivot member on said shifting member intermediate the axis of said wheel and the axis of said pulley; a first hinged arm pivoted on and extending to one side of said pivot member; a forward roller mounted on the extremity of said first arm; a pair of arms pivoted on and extending from the opposite side of said pivot member; a reverse roller mounted on one arm of said pair; an intermediate roller mounted on the other arm of said pair; a tension spring extending between the arms of the forward and reverse rollers to hold the latter in contact with said wheel; and means for rotating said shifting member about the axis of said drive pulley to selectively pull either said first roller or said intermediate roller into contact with said pulley.

4. A reversible power transmission device comprising: a drive pulley; a driven wheel spaced from said drive pulley; a shifting member rotatable about the axis of said drive pulley; a pivot member on said shifting member intermediate the axis of said wheel and the axis of said pulley; a first hinged arm pivoted on and extending to one side of said pivot member; a forward roller mounted on the extremity of said first arm; a pair of arms pivoted on and extending from the opposite side of said pivot member; a reverse roller mounted on one arm of said pair; an intermediate roller mounted on the other arm of said pair; a tension spring extending between the arms of the forward and reverse rollers to hold the latter in contact with said wheel; a second tension spring between the arms of the reverse and intermediate rollers to hold the latter together; and means for rotating said shifting member about the axis of said drive pulley to selectively pull either said first roller or said pair of rollers into contact with said pulley and wheel as desired.

5. A reversible power transmission device comprising: a drive pulley; a driven wheel adjacent to and in the same plane with said drive pulley; a movably mounted shifting member; a pivot member on said shifting member intermediate the axes of said pulley and wheel; three independent arms hinged on said pivot member, a pair of said arms projecting to one side of said pulley and wheel, the remaining single arm projecting to the other side thereof; a friction roller carried by each of said arms of sufficient diameter so that the roller on the single arm will be pulled into contact between said pulley and wheel when said shifting member is moved in one direction and so that the rollers on the pair of arms will be pulled into contact with each other and with said pulley and wheel when said shifting member is moved in the opopsite direction.

6. A reversible friction drive comprising: a series of independent, swinging, rollers carrying arms mounted on a common pivot between a drive wheel and driven wheel lying in the same plane; a roller journalled on each arm; and means for changing the position of the common pivot to bring predetermined rollers into frictional contact between said wheels.

HAROLD G. DAVIS.